(12) United States Patent
Zhu et al.

(10) Patent No.: US 11,644,402 B2
(45) Date of Patent: May 9, 2023

(54) SIMULATION DEVICE FOR PREFERENTIAL FLOW OF FISSURED-POROUS DUAL-PERMEABILITY MEDIA AND EXPERIMENTAL METHOD

(71) Applicant: Guilin University of Technology, Guilin (CN)

(72) Inventors: Bin Zhu, Guilin (CN); Jilin Chen, Guilin (CN); Mingqing Zhu, Guilin (CN); Jing Zhang, Guilin (CN); Caimei Luo, Guilin (CN); Jiahui Wu, Guilin (CN)

(73) Assignee: Guilin University of Technology, Guilin (CN)

( * ) Notice: Subject to any disclaimer, the term of this patent is extended or adjusted under 35 U.S.C. 154(b) by 435 days.

(21) Appl. No.: 16/878,889

(22) Filed: May 20, 2020

(65) Prior Publication Data
US 2021/0116347 A1    Apr. 22, 2021

(30) Foreign Application Priority Data
Oct. 22, 2019   (CN) .......................... 201911007643.8

(51) Int. Cl.
*G01N 13/00* (2006.01)
*G06T 7/62* (2017.01)
(Continued)

(52) U.S. Cl.
CPC ............. *G01N 13/00* (2013.01); *G01N 13/04* (2013.01); *G01N 15/082* (2013.01);
(Continued)

(58) Field of Classification Search
CPC ....... G01N 13/00; G01N 13/04; G01N 15/082
See application file for complete search history.

(56) References Cited

U.S. PATENT DOCUMENTS 5,789,662 A * 8/1998 Dayal ................ G01N 15/0826
                                                          73/38
8,026,956 B2 * 9/2011 Kurane ................... G06T 5/009
                                                          348/222.1
(Continued)

FOREIGN PATENT DOCUMENTS

CN    105823720 A  *  8/2016  ............ G01N 15/08
CN    206311468 U  *  7/2017
(Continued)

OTHER PUBLICATIONS

Zeigler "Determination of Rock Mass Permeability," Soils and Pavements Laboratory, U.S. Army Engineer Waterways Experimetn Station TR-S-76-2 (Year: 1976).*

*Primary Examiner* — John Fitzgerald
(74) *Attorney, Agent, or Firm* — Dorsey & Whitney LLP

(57) ABSTRACT

The present invention discloses a simulation device for a preferential flow of a fissured-porous dual-permeability media and an experimental method, and belongs to the technical field of geological engineering. The simulation device comprises a support. The support is detachably connected with a transparent container. The interior of the transparent container is filled with a fissured-porous dual-permeability media experimental model. The top of the transparent container is open. A spraying device is arranged above the transparent container. Liquid rapid outflow ports are formed in the bottom of the transparent container and are connected with a liquid collection device. The present invention further discloses an experimental method of the simulation device and a manufacturing method of the fissured-porous dual-permeability media experimental model. The simulation device of the present invention can highlight and enhance the preferential flow experiment effect.

20 Claims, 3 Drawing Sheets

(51) Int. Cl.
  *G06T 7/00*   (2017.01)
  *G01N 13/04*  (2006.01)
  *G01N 15/08*  (2006.01)

(52) U.S. Cl.
  CPC .............. *G06T 7/0002* (2013.01); *G06T 7/62*
      (2017.01); *G06T 2207/30181* (2013.01)

(56) References Cited

U.S. PATENT DOCUMENTS

| | | | |
|---|---|---|---|
| 10,788,408 B2* | 9/2020 | Yang | B09C 1/002 |
| 2012/0151998 A1* | 6/2012 | Willberg | G01N 1/286 |
| | | | 73/38 |
| 2019/0206279 A1* | 7/2019 | Li | G01V 99/00 |
| 2020/0324269 A1* | 10/2020 | Torii | A61L 15/24 |

FOREIGN PATENT DOCUMENTS

| | | | | |
|---|---|---|---|---|
| CN | 107941658 A | * | 4/2018 | ............. G01N 13/00 |
| CN | 108106981 A | * | 6/2018 | |

* cited by examiner

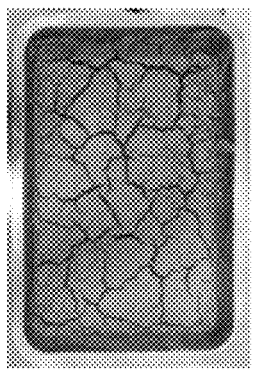 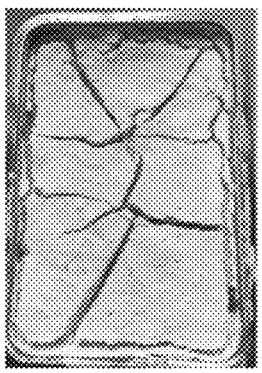 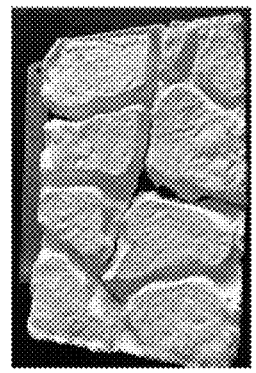 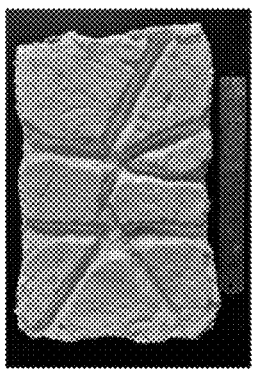
FIG. 3a     FIG. 3b     FIG. 3c     FIG. 3d
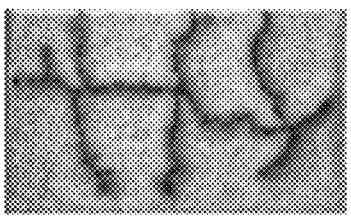 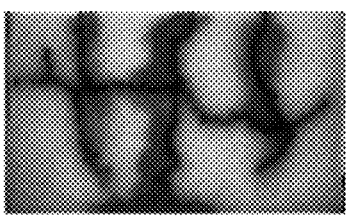 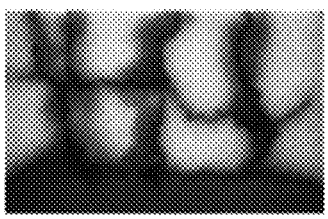
FIG. 4a     FIG. 4b     FIG. 4c
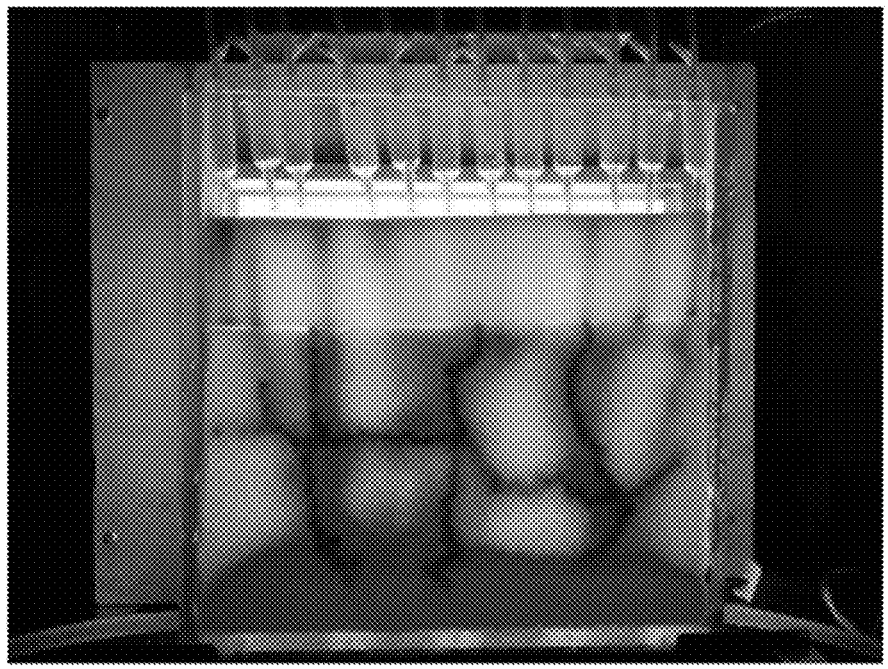
FIG. 5

SIMULATION DEVICE FOR PREFERENTIAL FLOW OF FISSURED-POROUS DUAL-PERMEABILITY MEDIA AND EXPERIMENTAL METHOD

TECHNICAL FIELD

The present invention relates to the technical field of geological engineering, and specifically to a simulation device for a preferential flow of a fissured-porous dual-permeability media and an experimental method.

BACKGROUND

Study on the preferential flow simulation experiment of a fissured-porous dual-permeability rock-soil media is important to the fields of geological engineering, groundwater science, geotechnical engineering, petroleum engineering and the like.

The fissured-porous dual-permeability rock media is easy to form a preferential flow due to its porosity difference. The preferential flow is of important significance during study on the geological environmental disasters such as rock-soil mass geological disasters, soil salinization, percolation in the vadose zone, formation of tundra and the like.

Transparentizing and visualizing preferential flow of a media with the complex fissured network is the main technical difficulty of the above-mentioned fields. The previous experimental technique for the preferential flow uses a trial pit method in the wild, and a soil column method in combination with an X-rays (or CT) scanning and imaging technology indoors. However, these methods have the defects as follows: using the trail pit method in the wild, the preferential flow of only one section can be observed, and the experimental period is long; using the soil column method indoors, the manufacture of a specimen is complex, and the experiment costs are high.

SUMMARY

The objective of the present invention is to provide a simulation device for a preferential flow of a fissured-porous dual-permeability media and an experimental method to solve the problems in the prior art.

The present invention provides a simulation device for a preferential flow of a fissured-porous dual-permeability media, comprising a support. The support is detachably connected with a transparent container. The interior of the transparent container is filled with a fissured-porous dual-permeability media experimental model. The top of the transparent container is open. A spraying device is arranged above the transparent container and is used for spraying liquid to the fissured-porous dual-permeability media experimental model. At least one liquid rapid outflow port is formed in the bottom of the transparent container and is connected with a liquid collection device.

Preferably, the simulation device further comprises a rear projection light source and an image information recording unit. The rear projection light source is arranged on the back of the transparent container. The image information recording unit is arranged in front of the transparent container.

Preferably, the spraying device comprises a nozzle. The nozzle is arranged above the transparent container and is also fixed to an electric push rod. The electric push rod is used for driving the nozzle to do reciprocating motion above the fissured-porous dual-permeability media experimental model. A supporting part for supporting the electric push rod is arranged on the support. The nozzle is also connected with a water supply device through a water tube. The electric push rod is electrically connected with a power supply.

Preferably, the rear projection light source is an LED lamp.

Preferably, the image information recording unit is an industrial camera.

Preferably, an experimental method for simulating the preferential flow of the fissured-porous dual-permeability media comprises the following steps:

S1: acquiring the distribution situation of real fissures, using a freezing method to generate a fissured-porous dual-permeability media experimental model simulating the fissure network, and acquiring the fissure ratio and fractal dimension information through PCAS statistic;

S2: placing the fissured-porous dual-permeability media experimental model in a transparent container, then adopting the PCAS to obtain porosity parameter information;

S3: spraying liquid containing a tracing substance to the fissured-porous dual-permeability media experimental model through a spraying device, wherein the tracing substance shows the trace of preferential flow; using a rear projection light source to enhance the development effect; shooting to record image information of the preferential flow;

S4: analyzing the image information to acquire the preferential flow process, and comparing the image information with a theoretical calculation result to obtain an experimental result.

Preferably, the step of using a freezing method to generate a fissured-porous dual-permeability media experimental model simulating the fissure network specifically comprises the following steps:

S101: modeling real fissures to obtain a fissure model capable of reflecting the distribution situation of the real fissures;

S102: placing the fissure model in a container, adding water to the container, and freezing the container to obtain an ice reversed model; separating the fissure model from the ice reversed model;

S103: at a low temperature from −10° C. to −5° C., pouring a coarse particle-agar mixture into hollow portions of the ice reversed model, then freezing the model to be hard, so as to obtain a fissure model manufactured by the coarse particle-agar mixture;

S104: separating the fissure model manufactured by the coarse particle-agar mixture from the ice reversed model, placing the fissure model into the transparent container, and filling the transparent container with fine particles;

S105: heating the transparent container with the fine particles over 47° C. to melt the agar material, then discharging the agar material from the transparent container; finally obtaining a dual-porosity experimental model, in which the fine particles simulate the porous media and the coarse particles simulate the fissured media.

Preferably, the tracing substance is tracing particles or the potassium permanganate solvent.

Preferably, the fine particles are melted quartz sands of the particle size in the range of 0.5-1 mm.

Preferably, the fine particles are transparent soil particles.

Compared with the prior art, the present invention has the beneficial effects: the simulation device of the present invention is based on the two-dimensional preferential flow percolation theory; the heterogeneity of the dual-permeability media is simulated by using the transparent soil particles to simulate the porous media and randomly unevenly distributing the particles of the different particle sizes; the fissure network is simulated and generated by using the modeling-freezing method; fluid field information and porosity-fissure geometric parameter information during experiment are obtained by using a combination of the particle image velocimetry (PIV) and the PCAS particle porosity-fissure image analysis technology.

The support of the simulation device for a preference flow of a fissured-porous dual-permeability media of the present invention is made of aluminum alloy. The transparent container and the rear projection light source are detachably connected with the support to meet change and maintenance of different experimental models and illumination devices. The movable nozzle can uniformly spray the liquid. The rear projection light source utilizes the LED light source. Therefore, the experiment effect of the preferential flow is highlighted and enhanced. Furthermore, the manufactured fissured-porous dual-permeability media experimental model is placed in the transparent container, so the experiment process is visible, and the formation of the preferential flow can be observed at any time.

The present invention adopts a fissure simulation formation technique to achieve all-around real-time visible display of the whole experiment process for simulating the preferential flow of the fissured-porous dual-permeability media. With reference to the transparent soil technology, the formation and development of the preferential flow can be observed from the interior of the media. Additionally, the simulation and random reconstruction of the media fissures can be achieved.

The present invention models and informationizes during material manufacture, experiment process display and result analysis, and can also be completed under general laboratory conditions. Once experiment period is largely shortened in comparison with the previous methods, thereby avoiding environment, staff and tedious process influence caused by excavation of a trial pit, manufacture of a soil column and scanning. The present invention can fully achieve simulation of the preferential flow formation of the fissured-porous dual-permeability media and problem analysis based on the theoretical analysis on the experiment result.

BRIEF DESCRIPTION OF THE DRAWINGS

FIG. 3a shows a fissured-porous media model manufactured by the red clay in the present invention.

FIG. 3b shows a fissured-porous media model manufactured by the expansive soil in the present invention.

FIG. 3c shows a reversed model of the red clay model of the present invention.

FIG. 3d shows a reversed model of the expansive soil model of the present invention.

FIG. 4a is a diagram showing an initial-stage effect of preferential flow simulation of a fissured-porous media in the present invention.

FIG. 4b is a diagram showing a simulating-stage effect of preferential flow simulation of a fissured-porous media in the present invention.

FIG. 4c is a diagram showing a final-stage effect of preferential flow simulation of a fissured-porous media in the present invention.

FIG. 5 is a diagram showing a final effect of preferential flow simulation of a fissured-porous media in the present invention.

DESCRIPTION OF REFERENCE SIGNS

Figure 1:
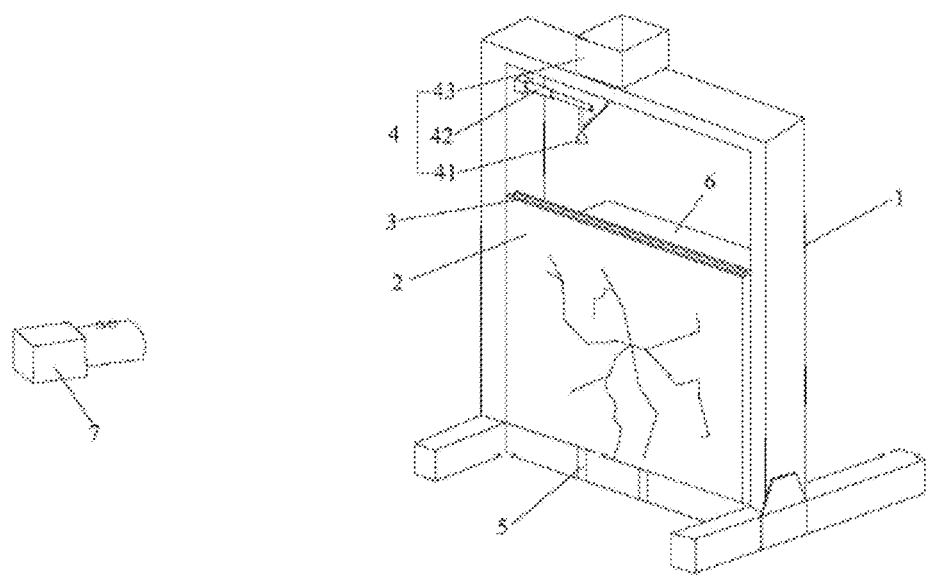
FIG. 1 is a schematic structural diagram of a simulation device of the present invention.
Figure 2:
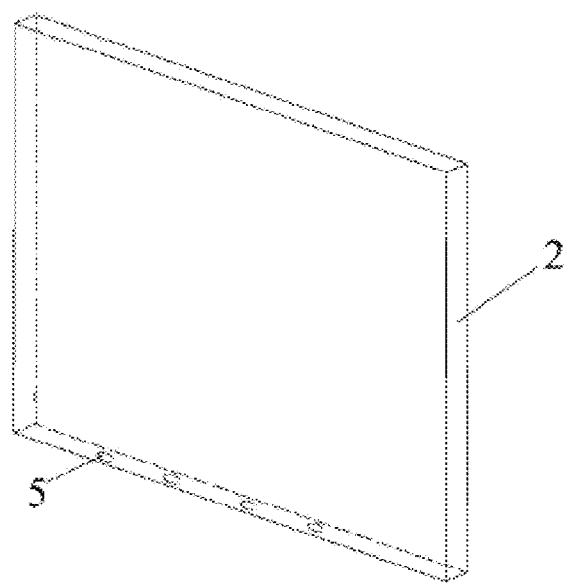
FIG. 2 is a schematic structural diagram of a transparent container of the present invention.

1—support, 2—transparent container, 3—fissured-porous dual-permeability media experimental model, 4—spraying device, 41—nozzle, 42—electric push rod, 43—water supply device, 5—liquid rapid outflow port, 6—rear projection light source, and 7—image information recording unit.

DESCRIPTION OF THE EMBODIMENTS

With reference to FIG. 1 to FIG. 6, the following describes the specific implementation manners of the present invention in detail. However, it should be understood that the protection scope of the present invention is not limited by the specific implementation manners. All other embodiments obtained by a person of ordinary skill in the art based on the embodiments of the present invention without creative efforts shall fall within the protection scope of the present invention.

The present invention provides a simulation device for a preferential flow of a fissured-porous dual-permeability media, comprising a support 1, wherein the support 1 is detachably connected with a transparent container 2; the interior of the transparent container 2 is filled with a fissured-porous dual-permeability media experimental model 3; the top of the transparent container 2 is open; a spraying device 4 is arranged above the transparent container 2 and is used for spraying liquid to the fissured-porous dual-permeability media experimental model 3; at least one liquid rapid outflow port 5 is formed in the bottom of the transparent container 2 and is connected with a liquid collection device. In the present invention, the fissured-porous dual-permeability media experimental model 3 is placed in the transparent container 2 to help to observe the percolation situation of the preferential flow. The transparent container 2 and the support 1 are detachably connected such that the fissured-porous dual-permeability media experimental model 3 can be conveniently placed in and taken out. The spraying device 4 is used for charging water or a tracing solution into the top of the fissured-porous dual-permeability media experimental model 3. The water or the tracing solution flows out through the liquid rapid outflow port 5 in the bottom of the transparent container 2 and then is collected.

The simulation device further comprises a rear projection light source 6 and an image information recording unit 7. The rear projection light source 6 is arranged on the back of the transparent container 2. The image information recording unit 7 is arranged in front of the transparent container 2. The rear projection light source 6 is used for more clearly developing such that the percolation situation can be conveniently observed. The image information recording unit 7 is used for recording the percolation process.

The spraying device 4 comprises a nozzle 41. The nozzle 41 is arranged above the transparent container 2 and is also fixed to an electric push rod 42. The electric push rod 42 is used for driving the nozzle 41 to do reciprocating motion above the fissured-porous dual-permeability media experimental model 3. A supporting part 8 for supporting the electric push rod 42 is arranged on the support 1. The nozzle 41 is also connected with a water supply device 43 through a water tube. The electric push rod 42 is electrically connected with a power supply. The spraying device 4 can also comprise a plurality of nozzles arranged above the transparent container 2, as shown in FIG. 5.

The rear projection light source 6 is an LED lamp.

The image information recording unit 7 is an industrial camera.

The embodiment further provides an experimental method for simulating the preferential flow of the fissured-porous dual-permeability media, comprising the following steps:

S1: acquiring the distribution situation of real fissures, using a freezing method to generate the fissured-porous dual-permeability media experimental model 3 simulating the fissure network, and acquiring the fissure ratio and fractal dimension information through PCAS statistic;

S2: placing the fissured-porous dual-permeability media experimental model 3 in the transparent container 2, then adopting the PCAS to obtain porosity parameter information;

S3: spraying liquid containing a tracing substance to the fissured-porous dual-permeability media experimental model 3 through the spraying device 4, wherein the tracing substance shows the trace of preferential flow; using the rear projection light source to enhance the development effect; shooting to record image information of the preferential flow;

S4: analyzing the image information to acquire the preferential flow process, and comparing the image information with a theoretical calculation result to obtain an experimental result.

The step of using a freezing method to generate the fissured-porous dual-permeability media experimental model 3 simulating the fissure network specifically comprises the following steps:

S101: modeling real fissures to obtain a fissure model capable of reflecting the distribution situation of the real fissures;

S102: placing the fissure model in a container, adding water to the container, and freezing the container to obtain an ice reversed model; separating the fissure model from the ice reversed model;

S103: at a low temperature from −10° C. to −5° C., pouring a coarse particle-agar mixture into hollow portions of the ice reversed model, then freezing the model to be hard, so as to obtain a fissure model manufactured by the coarse particle-agar mixture;

S104: separating the fissure model manufactured by the coarse particle-agar mixture from the ice reversed model, placing the fissure model into the transparent container, and filling the transparent container with fine particles;

wherein the fissure model can be placed in the transparent container with the ice blocks; the ice blocks are melted at room temperature; the fine particles are filled in the container; then a potassium permanganate tracing substance can transparently display an experimental effect of a preferential flow formation and development process in real time.

S105: heating the transparent container with the fine particles over 47° C. to melt the agar material, then discharging the agar material from the transparent container; finally obtaining a dual-porosity experimental model, in which the fine particles simulate the porous media and the coarse particles simulate the fissured media.

The tracing substance is tracing particles or the potassium permanganate solvent.

The transparent container 2 is manufactured by transparent acrylic plates. The size of the transparent container 2 may be 30*1.5*30 cm.

The fine particles are melted quartz sands of the particle size in the range of 0.5-1 mm.

The fine particles are transparent soil particles.

It should be noted that the modeling material in S101 may be gypsum, natural resin, wax and the like.

The transparent soil particles may be formed by mixing the melted quartz sand fine particles with the pore solution according to a general proportion. The pore solution is prepared from an n-tridecane and white mineral oil 15 mixed solution. The refractive index of the melted quartz sand particle is 1.4583. When the mass ratio of the n-tridecane to the white mineral oil 15 is 1:6, the artificially synthesized mixed solution has the best transparent effect, and the refractive index of the mixed solution is the closest to that of the melted quartz sand.

Figure 6:
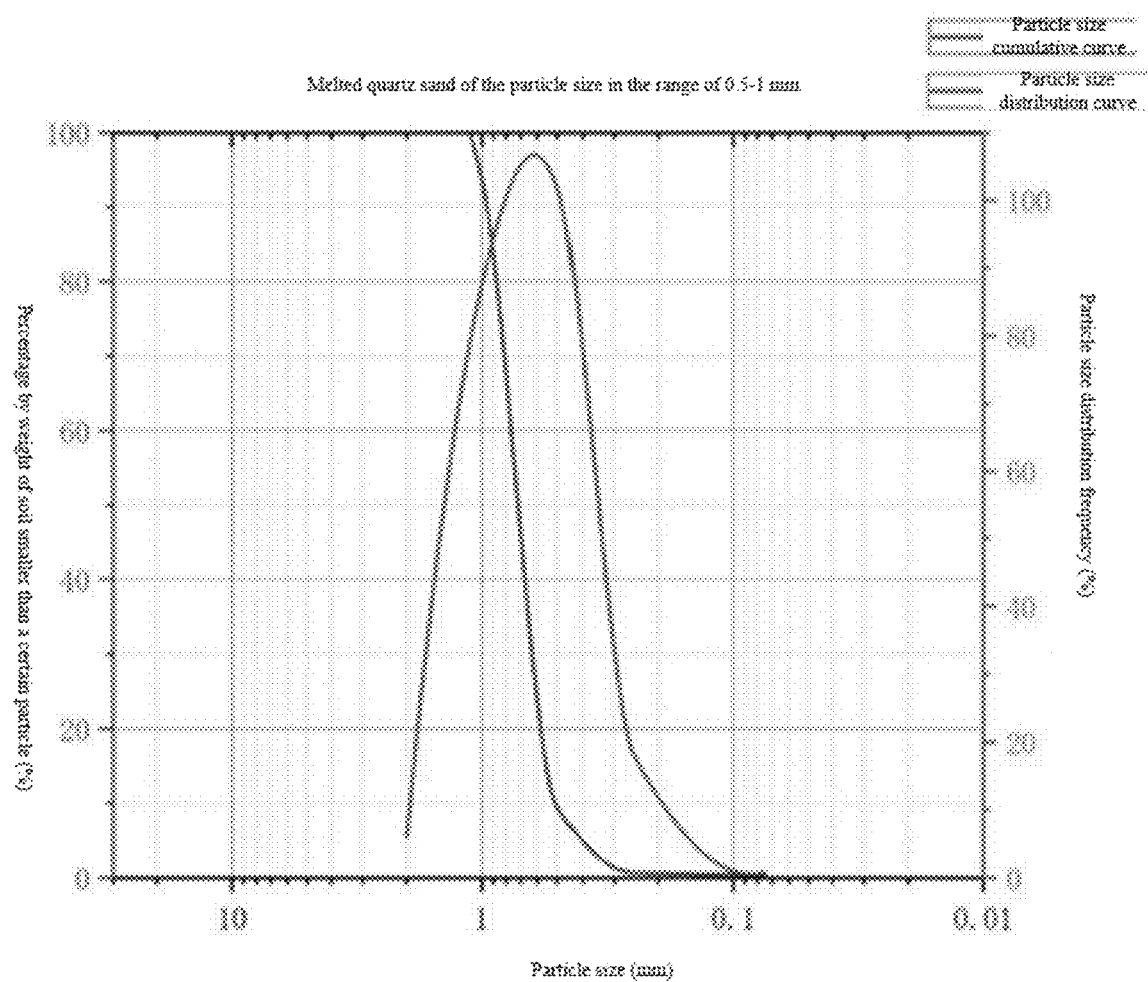
FIG. 6 is a diagram showing particle size grading curves of fine particles in the present invention.

The coarse particle is an imporous solid small round plastic bead of the particle size of 6 mm. The ratio of the coarse particles to the agar is defined according to the size of the fissure. The fine particles adopt the melted quartz sands of the particle size in the range of 0.5-1 mm. The melted quartz sands are screened by sequentially using standard sieves of 2 mm, 1 mm, 0.5 mm, 0.25 mm, 0.1 mm, 0.075 mm through a screening method, wherein the obtained particle size grading curves are shown in FIG. 6.

The nonuniform coefficient is calculated by the following formula:

$$C_u = \frac{d_{60}}{d_{10}}$$

Where, $C_u$-nonuniform coefficient;
$d_{60}$-constrained particle size;
$d_{10}$-effective particle size.

The coefficient of curvature is calculated by the following formula:

$$C_c = \frac{d_{30}^2}{d_{10} * d_{60}}$$

Where, $C_c$-coefficient of curvature;
$d_{60}$-particle size corresponding to soil which has the cumulative percentage by weight of 60% and the particle size of which is smaller than a certain particle size;

according to a cumulative curve, it can be seen that: to a particle size specimen of the melted quartz sand of the particle size in the range of 0.5-1.0 mm, $d_{60}$=0.82, $d_{30}$=0.64, $d_{10}$=0.53, thereby obtaining $C_u$=1.55, $C_c$=0.94. Therefore, the fine particles for the experiment are uniform melted quartz sand particles of the particle size in the range of 0.5-1 mm.

The present invention further verifies the implementation effect of the above simulation device and the experimental method. FIGS. 3a, 3b, 3c and 3d of the present invention show the formation of two fissures by red clay and expansive soil and their reversed model finished products. Based on FIGS. 3a, 3b, 3c and 3d, the forms of the fissures manufactured by different soils are different; specifically, the fissure manufactured by the red clay is winding, and the fissure manufactured by the expansive soil is straight.

Using the expansive soil as the prototype, FIGS. 4a, 4b and 4c show the fissured-porous media which is manufactured by using the particles to simulate the expansive soil and the preferential flow simulation effect after the fissured-porous media is placed in the transparent container.

FIG. 5 is a diagram showing the final percolation simulation effect. As shown in the drawings of the specification, the simulation device of the present invention completely achieves the simulation of the preferential flow of the fissured-porous media and has excellent implementation effect. The fissure rate, the fractal dimension information and the like can be obtained through the digital images obtained from the industrial camera by applying the PCAS software.

Although the embodiments of the present invention have been illustrated and described, it should be understood that those of ordinary skill in the art may make various changes, modifications, replacements and variations to the above embodiments without departing from the principle and spirit of the present invention, and the scope of the present invention is limited by the appended claims and their legal equivalents.

What is claimed is:

1. A simulation device for a preferential flow of a fissured-porous dual-permeability media, the simulation device comprising:
   a support;
   a transparent container detachably connected to the support, wherein the transparent container includes an interior that is filled with a fissured-porous dual-permeability media experimental model and a top of the transparent container is open;
   a spraying device is arranged above the transparent container and is used for spraying water to the fissured-porous dual-permeability media experimental model; and
   at least one liquid rapid outflow port is formed in the bottom of the transparent container and is connected with a liquid collection device.

2. The simulation device according to claim 1, wherein the simulation device further comprises a rear projection light source and an image information recording unit; the rear projection light source is arranged on the back of the transparent container; the image information recording unit is arranged in front of the transparent container.

3. An experimental method of the simulation device for a preferential flow of the fissured-porous dual-permeability media according to claim 2, comprising:
   S1: acquiring the distribution situation of real fissures, using a freezing method to generate a fissured-porous dual-permeability media experimental model (3) simulating the fissure network, and acquiring the fissure ratio and fractal dimension information through PCAS statistic;
   S2: placing the fissured-porous dual-permeability media experimental model (3) in a transparent container (2), then adopting the PCAS to obtain porosity parameter information;
   S3: spraying water containing a tracing substance to the fissured-porous dual-permeability media experimental model (3) through a spraying device (4), wherein the tracing substance shows the trace of preferential flow; using a rear projection light source to enhance the development effect; shooting to record image information of the preferential flow;
   S4: analyzing the image information to acquire the preferential flow process, and comparing the image information with a theoretical calculation result to obtain an experimental result.

4. An experimental method for simulating the preferential flow of the fissured-porous dual-permeability media according to claim 3, wherein the step of using a freezing method to generate a fissured-porous dual-permeability media experimental model (3) simulating the fissure network specifically comprises the following steps:

S101: modeling real fissures to obtain a fissure model capable of reflecting the distribution situation of the real fissures;
S102: placing the fissure model in a container, adding water to the container, and freezing the container to obtain an ice reversed model; separating the fissure model from the ice reversed model;
S103: at a low temperature from −10° C. to −5° C., pouring a coarse particle-agar mixture into hollow portions of the ice reversed model, then freezing the model to be hard, so as to obtain a fissure model manufactured by the coarse particle-agar mixture;
S104: separating the fissure model manufactured by the coarse particle-agar mixture from the ice reversed model, placing the fissure model into the transparent container, and filling the transparent container with fine particles;
S105: heating the transparent container with the fine particles over 47° C. to melt the agar material, then discharging the agar material from the transparent container; finally obtaining a dual-porosity experimental model, in which the fine particles simulate the porous media and the coarse particles simulate the fissured media.

5. The experimental method for simulating the preferential flow of the fissured-porous dual-permeability media according to claim 3, wherein the tracing substance is tracing particles or the potassium permanganate solvent.

6. The simulation device according to claim 1, wherein the spraying device comprises a nozzle; the nozzle is arranged above the transparent container and is also fixed to an electric push rod; the electric push rod is used for driving the nozzle to perform a reciprocating motion above the fissured-porous dual-permeability media experimental model; a supporting part for supporting the electric push rod is arranged on the support; the nozzle is also connected with a water supply device through a water tube; the electric push rod is electrically connected with a power supply.

7. An experimental method of the simulation device for a preferential flow of the fissured-porous dual-permeability media according to claim 6, comprising:
   S1: acquiring the distribution situation of real fissures, using a freezing method to generate a fissured-porous dual-permeability media experimental model (3) simulating the fissure network, and acquiring the fissure ratio and fractal dimension information through PCAS statistic;
   S2: placing the fissured-porous dual-permeability media experimental model (3) in a transparent container (2), then adopting the PCAS to obtain porosity parameter information;
   S3: spraying water containing a tracing substance to the fissured-porous dual-permeability media experimental model (3) through a spraying device (4), wherein the tracing substance shows the trace of preferential flow; using a rear projection light source to enhance the development effect; shooting to record image information of the preferential flow;
   S4: analyzing the image information to acquire the preferential flow process, and comparing the image information with a theoretical calculation result to obtain an experimental result.

8. An experimental method for simulating the preferential flow of the fissured-porous dual-permeability media according to claim 7, wherein the step of using a freezing method to generate a fissured-porous dual-permeability media experimental model (3) simulating the fissure network specifically comprises the following steps:
- S101: modeling real fissures to obtain a fissure model capable of reflecting the distribution situation of the real fissures;
- S102: placing the fissure model in a container, adding water to the container, and freezing the container to obtain an ice reversed model; separating the fissure model from the ice reversed model;
- S103: at a low temperature from −10° C. to −5° C., pouring a coarse particle-agar mixture into hollow portions of the ice reversed model, then freezing the model to be hard, so as to obtain a fissure model manufactured by the coarse particle-agar mixture;
- S104: separating the fissure model manufactured by the coarse particle-agar mixture from the ice reversed model, placing the fissure model into the transparent container, and filling the transparent container with fine particles;
- S105: heating the transparent container with the fine particles over 47° C. to melt the agar material, then discharging the agar material from the transparent container; finally obtaining a dual-porosity experimental model, in which the fine particles simulate the porous media and the coarse particles simulate the fissured media.

9. The experimental method for simulating the preferential flow of the fissured-porous dual-permeability media according to claim 7, wherein the tracing substance is tracing particles or the potassium permanganate solvent.

10. The simulation device according to claim 1, wherein the rear projection light source is an LED lamp.

11. An experimental method of the simulation device for a preferential flow of a fissured-porous dual-permeability media according to claim 10, comprising the following steps:
- S1: acquiring the distribution situation of real fissures, using a freezing method to generate a fissured-porous dual-permeability media experimental model (3) simulating the fissure network, and acquiring the fissure ratio and fractal dimension information through PCAS statistic;
- S2: placing the fissured-porous dual-permeability media experimental model (3) in a transparent container (2), then adopting the PCAS to obtain porosity parameter information;
- S3: spraying water containing a tracing substance to the fissured-porous dual-permeability media experimental model (3) through a spraying device (4), wherein the tracing substance shows the trace of preferential flow; using a rear projection light source to enhance the development effect; shooting to record image information of the preferential flow;
- S4: analyzing the image information to acquire the preferential flow process, and comparing the image information with a theoretical calculation result to obtain an experimental result.

12. An experimental method for simulating the preferential flow of the fissured-porous dual-permeability media according to claim 11, wherein the step of using a freezing method to generate a fissured-porous dual-permeability media experimental model (3) simulating the fissure network specifically comprises the following steps:
- S101: modeling real fissures to obtain a fissure model capable of reflecting the distribution situation of the real fissures;
- S102: placing the fissure model in a container, adding water to the container, and freezing the container to obtain an ice reversed model; separating the fissure model from the ice reversed model;
- S103: at a low temperature from −10° C. to −5° C., pouring a coarse particle-agar mixture into hollow portions of the ice reversed model, then freezing the model to be hard, so as to obtain a fissure model manufactured by the coarse particle-agar mixture;
- S104: separating the fissure model manufactured by the coarse particle-agar mixture from the ice reversed model, placing the fissure model into the transparent container, and filling the transparent container with fine particles;
- S105: heating the transparent container with the fine particles over 47° C. to melt the agar material, then discharging the agar material from the transparent container; finally obtaining a dual-porosity experimental model, in which the fine particles simulate the porous media and the coarse particles simulate the fissured media.

13. The simulation device according to claim 1, wherein the image information recording unit includes an industrial camera.

14. An experimental method of the simulation device for a preferential flow of the fissured-porous dual-permeability media according to claim 13, comprising:
- S1: acquiring the distribution situation of real fissures, using a freezing method to generate a fissured-porous dual-permeability media experimental model (3) simulating the fissure network, and acquiring the fissure ratio and fractal dimension information through PCAS statistic;
- S2: placing the fissured-porous dual-permeability media experimental model (3) in a transparent container (2), then adopting the PCAS to obtain porosity parameter information;
- S3: spraying water containing a tracing substance to the fissured-porous dual-permeability media experimental model (3) through a spraying device (4), wherein the tracing substance shows the trace of preferential flow; using a rear projection light source to enhance the development effect; shooting to record image information of the preferential flow; and
- S4: analyzing the image information to acquire the preferential flow process, and comparing the image information with a theoretical calculation result to obtain an experimental result.

15. An experimental method for simulating the preferential flow of the fissured-porous dual-permeability media according to claim 10, wherein the step of using a freezing method to generate a fissured-porous dual-permeability media experimental model (3) simulating the fissure network specifically comprises the following steps:
- S101: modeling real fissures to obtain a fissure model capable of reflecting the distribution situation of the real fissures;
- S102: placing the fissure model in a container, adding water to the container, and freezing the container to obtain an ice reversed model; separating the fissure model from the ice reversed model;
- S103: at a low temperature from −10° C. to −5° C., pouring a coarse particle-agar mixture into hollow portions of the ice reversed model, then freezing the model to be hard, so as to obtain a fissure model manufactured by the coarse particle-agar mixture;

S104: separating the fissure model manufactured by the coarse particle-agar mixture from the ice reversed model, placing the fissure model into the transparent container, and filling the transparent container with fine particles;

S105: heating the transparent container with the fine particles over 47° C. to melt the agar material, then discharging the agar material from the transparent container; finally obtaining a dual-porosity experimental model, in which the fine particles simulate the porous media and the coarse particles simulate the fissured media.

16. An experimental method of the simulation device for a preferential flow of a fissured-porous dual-permeability media according to claim 1, the experimental method comprising:

S1: acquiring the distribution situation of real fissures, using a freezing method to generate a fissured-porous dual-permeability media experimental model simulating the fissure network, and acquiring the fissure ratio and fractal dimension information through PCAS statistic;

S2: placing the fissured-porous dual-permeability media experimental model in a transparent container, then adopting the PCAS to obtain porosity parameter information;

S3: spraying water containing a tracing substance to the fissured-porous dual-permeability media experimental model through a spraying device, wherein the tracing substance shows the trace of preferential flow; using a rear projection light source to enhance the development effect; shooting to record image information of the preferential flow; and S4: analyzing the image information to acquire the preferential flow process, and comparing the image information with a theoretical calculation result to obtain an experimental result.

17. The experimental method for simulating the preferential flow of the fissured-porous dual-permeability media according to claim 16, wherein the tracing substance is tracing particles or the potassium permanganate solvent.

18. An experimental method for simulating the preferential flow of the fissured-porous dual-permeability media according to claim 16, wherein the step of using a freezing method to generate a fissured-porous dual-permeability media experimental model (3) simulating the fissure network specifically comprises:

S101: modeling real fissures to obtain a fissure model capable of reflecting the distribution situation of the real fissures;

S102: placing the fissure model in a container, adding water to the container, and freezing the container to obtain an ice reversed model; separating the fissure model from the ice reversed model;

S103: at a low temperature from −10° C. to −5° C., pouring a coarse particle-agar mixture into hollow portions of the ice reversed model, then freezing the model to be hard, so as to obtain a fissure model manufactured by the coarse particle-agar mixture;

S104: separating the fissure model manufactured by the coarse particle-agar mixture from the ice reversed model, placing the fissure model into the transparent container, and filling the transparent container with fine particles;

S105: heating the transparent container with the fine particles over 47° C. to melt the agar material, then discharging the agar material from the transparent container; finally obtaining a dual-porosity experimental model, in which the fine particles simulate the porous media and the coarse particles simulate the fissured media.

19. The experimental method for simulating the preferential flow of the fissured-porous dual-permeability media according to claim 18, wherein the fine particles are melted quartz sands of the particle size in the range of 0.5-1 mm.

20. The experimental method for simulating the preferential flow of the fissured-porous dual-permeability media according to claim 18, wherein the fine particles are transparent soil particles.

* * * * *